United States Patent
Bell et al.

(10) Patent No.: US 7,305,702 B2
(45) Date of Patent: Dec. 4, 2007

(54) SYSTEMS AND METHODS FOR DISTRIBUTED ADMINISTRATION OF PUBLIC AND PRIVATE ELECTRONIC MARKETS

(75) Inventors: David G. Bell, Menlo Park, CA (US); Anthony Tao Liang, Fremont, CA (US); Mitch Garnaat, Fairport, NY (US); Francoise Brun-Cottan, West Hollywood, CA (US)

(73) Assignee: Xerox Corporation, Stamford, CT (US)

( * ) Notice: Subject to any disclaimer, the term of this patent is extended or adjusted under 35 U.S.C. 154(b) by 1001 days.

(21) Appl. No.: 10/042,963

(22) Filed: Jan. 9, 2002

(65) Prior Publication Data

US 2003/0130952 A1 Jul. 10, 2003

(51) Int. Cl.
  *G06F 7/04* (2006.01)
(52) U.S. Cl. .......................................... 726/5
(58) Field of Classification Search ...................... 726/5
  See application file for complete search history.

(56) References Cited

U.S. PATENT DOCUMENTS

| | | | |
|---|---|---|---|
| 5,444,779 A | 8/1995 | Daniele | |
| 5,530,235 A | 6/1996 | Stefik et al. | |
| 5,530,520 A | 6/1996 | Clearwater | |
| 5,629,980 A | 5/1997 | Stefik et al. | |
| 5,634,012 A | 5/1997 | Stefik et al. | |
| 5,638,443 A | 6/1997 | Stefik et al. | |
| 5,682,540 A | 10/1997 | Klotz, Jr. et al. | |
| 5,715,403 A | 2/1998 | Stefik | |
| 5,930,801 A | 7/1999 | Falkenhainer et al. | |
| 5,960,441 A | 9/1999 | Bland et al. | |
| 5,968,177 A * | 10/1999 | Batten-Carew et al. | 726/4 |
| 6,185,684 B1 | 2/2001 | Pravetz et al. | |
| 6,205,549 B1 | 3/2001 | Pravetz | |
| 6,389,538 B1 * | 5/2002 | Gruse et al. | 713/194 |
| 6,631,495 B2 * | 10/2003 | Kato et al. | 715/500 |
| 6,948,070 B1 * | 9/2005 | Ginter et al. | 713/193 |
| 2002/0016727 A1 * | 2/2002 | Harrell et al. | 705/7 |
| 2003/0014317 A1 * | 1/2003 | Siegel et al. | 705/22 |

FOREIGN PATENT DOCUMENTS

WO  WO 01/16826 A1 * 3/2001

OTHER PUBLICATIONS

"Will Fatbrain.com's New Model Work?" by Chet Dembeck; E-Commerce Times, Sep. 10, 1999; article found Jan. 8, 2002 at http://www.ecommercetimes.com/perl/story/1205.html.

(Continued)

*Primary Examiner*—Kambiz Zand
*Assistant Examiner*—Aubrey H Wyszynski
(74) *Attorney, Agent, or Firm*—Fay Sharpe LLP

(57) ABSTRACT

Set forth is a system and method for administering electronic markets which include encrypted electronic content. The system provides access to a communication network having an electronic server system configured to permit communication among a community of users, where the server system is used to host the electronic markets. A distributed configuration and administration system permits any authorized user of the community of users to have the capability of configuring and administrating electronic markets. A set of access permissions control which users of the community of users have access to electronic markets, and a set of usage permissions control the use of content contained in the electronic markets. A set of management permissions control which users of the community of users can manage the access and usage permissions for markets and content.

23 Claims, 13 Drawing Sheets

OTHER PUBLICATIONS

"Seybold: Fatbrain takes Publishing to the Masses" by James Niccolai; IDG News Service, Aug. 31, 1999; Network World Fusion News; article found Jan. 8, 2002 at http://www.nwfusion.com/news/1999/0831fatbrain.html.

"IBM to Unveil Digital Music Copy Protections" by Dawn C. Chmielewski; Mercury News, Jan. 21, 2001; article found Jan. 8, 2002 at wysiwyg://48/http://www.iarchive.c...s/jan-01/IBMunveildigitalmusic.htm.

"Chris MacAskill CEO, Mighty Words", interviewed by David Needle, Aug. 7, 2000; Tech Week Talking Points; article found Jan. 8, 2002 at http://www.techweek.com/articles/8-07-00/talk.htm.

* cited by examiner

FIG. 2

View Permissions

Title: A trial pdf document - View Only
Owner: tao
Access List:

| User/Group | View | Print | Write | Manage | Fee |
|---|---|---|---|---|---|
| Default Fee (*) | | | | | |
| Tao Liang | x | x | | x | 5* |
| Anyone | x | x | x | | 5* |
| | | | | | 10 |

Usage Permissions | Usage Fees

*Flow*Port™ Cover Sheet
Put this Cover Sheet in front of your document
Oct 26 14.38.47 PDT 2000

Paper Interface to Electronic Markets for David Bell

432 Cover sheet for scanning and specifying rights on documents

➤ Markets

☐ Marketplace #1
☐ Marketplace #2

434

➤ Permissions and fees

☐ View ☐ Fee Example: $ 5 2 5 . 8 9

```
0 ☐☐☐ , ☐☐
1 ☐☐☐   ☐☐
2 ☐☐☐   ☐☐
3 ☐☐☐   ☐☐
4 ☐☐☐   ☐☐
5 ☐☐☐   ☐☐
6 ☐☐☐   ☐☐
7 ☐☐☐   ☐☐
8 ☐☐☐   ☐☐
9 ☐☐☐   ☐☐
```

☐ Print ☐ Fee

```
0 ☐☐☐ , ☐☐
1 ☐☐☐   ☐☐
2 ☐☐☐   ☐☐
3 ☐☐☐   ☐☐
4 ☐☐☐   ☐☐
5 ☐☐☐   ☐☐
6 ☐☐☐   ☐☐
7 ☐☐☐   ☐☐
8 ☐☐☐   ☐☐
9 ☐☐☐   ☐☐
```

436 — ☐ Cancel & Refresh  ☐ ? Help

FlowPort™ Cover Sheet
Put this Cover Sheet in front of your document

Oct 26 14.38.47 PDT 2000

Paper Interface to Electronic Markets

452 — Paper Token for Printing/Copying Document #1 in Marketplace #1

→ Price: $5.00 each

456 →

→ Quantity:

0 1 2 3 4 5 6 7 8 9
☐ ☐ ☐ ☐ ☐ ☐ ☐ ☐ ☐ ☐

454 — Page 1 of 9

UNIVERSITIES IN THE DIGITAL AGE
By John Keely Hewitt and Paul Gilgood

458 →

→ Method of Fulfillment:

☐ Local copy
☐ E-mail copy
☐ Internet Fax
☐ Postal Mail
☐ Express Mail

462 — Please place personal one-use security sticker here

☐ Cancel & Refresh     ☐ Help

SYSTEMS AND METHODS FOR DISTRIBUTED ADMINISTRATION OF PUBLIC AND PRIVATE ELECTRONIC MARKETS

BACKGROUND OF THE INVENTION

The present invention relates to the fields of electronic marketplaces and encrypted electronic products, and more particularly to the administration of electronic markets that incorporate control of usage permissions for encrypted electronic products.

Existing electronic markets include, for example, auctions where sellers place products up for bid to buyers, or storefronts where products are offered for sale or license at a specific price.

These electronic markets are typically public markets, and therefore a party placing a product for sale, license or bid presents the product to all persons capable of connecting to the system, without the ability to electronically control who is permitted to access the market or who is permitted to use their products.

These electronic markets function as centrally administered mass meeting venues, where large numbers of buyers and sellers interact. They are technically challenging to create and require significant economic investment to build and maintain. The centralized administration of market controls means that to participate a seller is required to utilize the centralized administration controls, including controls on who is permitted to access the market and who is permitted to use the products. Thus, in these centrally administrated public markets, owners of the products have little or no direct control over the configuration or operation of the market.

Further, it is becoming common for the products being distributed through electronic marketplaces to be electronic products. For example, audio and video recordings, software, electronic books and multi-media works are all being electronically published. Electronically published materials are typically distributed in a digital form and copied on a computer-based system having the capability to display or otherwise use the materials. A fundamental issue facing those undertaking electronic publishing, is how to control and prevent the unauthorized and unaccounted distribution or usage of electronically published products. Authors and publishers may want to control who is permitted to use electronic products, and to be able to change permissions over time even after the products are distributed. Authors and publishers may also want to sell the electronic products or receive royalties for each counted delivery of the products, therefore any unaccounted distribution of the products results in unpaid royalties.

Existing web repository systems where a plurality of users can share sets of electronic products such as DocuShare™ (a trademark of Xerox Corporation), permit end users to share electronic products and administer and control initial access with individual and group access permissions through password-protected accounts, non-location-based URLs, and permissions matrices that associate access permissions for specified accounts with specified electronic products. However, end users are not able to administer or control ongoing usage with individual and group usage permissions for encrypted files through the system. Here usage is distinguished from access, in that usage refers to actually using the product (e.g., viewing or printing), and access refers to accessing a copy of the product, which if encrypted is not usable without a key for decryption. Further, end users are not able to create markets (public or private) with usage and payment options associated with individual and group accounts for particular electronic products.

Existing systems for controlling the distribution and use of electronic products such as ContentGuard™ (a trademark of Xerox Corporation), allow publishers to encrypt electronic products and specify digital property rights. However, end users cannot administer or control usage of particular electronic materials for particular individuals or groups, and only central administrators can control who has access to a market. Also, digital property rights are attached to the digital products using rights labels, and such rights are intended to be permanent or at best narrowed rather than broadened. Furthermore, because the rights labels are attached to the digital products, there is no means of changing rights options for copies of digital products that are in the customers' hands, except to locate each one of them and change the options individually. Thus, once the copies of digital products are outside of the possession of the seller, digital rights cannot be changed even if the user purchases the license after the time of the desired change.

Further, existing systems which include management of usage permissions or digital rights are currently only accessible through electronic user interfaces. There is no ability to automatically correlate usage permissions or digital rights with paper documents.

Thus, known systems for the distribution of electronic products, do not provide for highly distributed configuration and administration of public and private electronic markets. They do not allow the marketmakers or sellers to control who may access and/or use the markets or products. These centralized systems further do not give sellers the ability to upload electronic products with usage permissions controls which may be altered by the marketmaker dependent upon a particular situation. Finally, these systems do not provide an interface between the electronic markets and paper documents.

SUMMARY OF THE INVENTION

In accordance with one aspect of the invention, set forth is a system and method for forming electronic markets which include electronic content, system provides access to a communication network having an electronic server system configured to permit communication among a community of users, where the server system is used to host the electronic markets. A distributed configuration and administration system permits any authorized user of the community of users to have the capability of configuring and administrating electronic markets. A set of access permissions control which users of the community of users have access to electronic markets, and a set of usage permissions control the use of content contained in the electronic markets. A set of management permissions control which users of the community of users can manage the access and usage permissions for markets and content.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 2 shows a matrix for content permissions implemented in accordance with concepts of the present invention;

FIG. 12 sets forth a paper interface to an electronic market in accordance with a concept of the present invention; and Shown in FIG. 13 is a token for use in the present system.

DETAILED DESCRIPTION OF THE PREFERRED EMBODIMENTS

An embodiment of the present invention provides a method and system which permits distributed administration of public and private markets, where end users or marketmakers create the markets and control access and usage, including what product (i.e., electronic content, electronic document, or document file) is to be for sale, and payment options. These markets may be hosted on servers where marketmakers exercise control via access through a worldwide electronic communication network such as a private network, Internet and/or World Wide Web or other system.

Access to private markets is controlled through passwords and through properties of account profiles such as group memberships. For digital content, marketmakers upload the content to a server, and specify digital usage permissions that limit viewing, listing and printing of the content. Payment options are fully controllable by the marketmaker, including subscriptions, pay-per-use and pay-per-document. The embodiments described require little technical expertise from the marketmaker to create electronic markets with usage permissions for electronic content. Password protection controls access to the markets, and encryption enables control of usage. Thus, any user of a community of users in a network is given the capability to set up their own market. The design of this system makes it feasible to create as small or large a market as desired by the marketmaker.

The distributed administration system permits the creation or authoring of the markets to allow a mixture of individual user accounts or user groups have varying levels of privileges for each market or individual content in each market. The marketmaker is given control to create and administer the market to his or her own needs. For example, the market may be created so that users or groups of users, when logged on, will read their unique privilege rights to see items in the market.

The marketmaker also has the ability to add items to a market and administrative privileges to add or delete user accounts and/or groups, among other administrative decisions. As will be described in greater detail below, permissions are stored separate from the content. By storing the permissions separate from the content, the ability to alter the permissions per each electronic content is easily achieved. Stored with the content is the electronic content identifier and a server location (e.g., URL (Universal Resource Locator) of the server storing the corresponding permissions).

Figure 1:
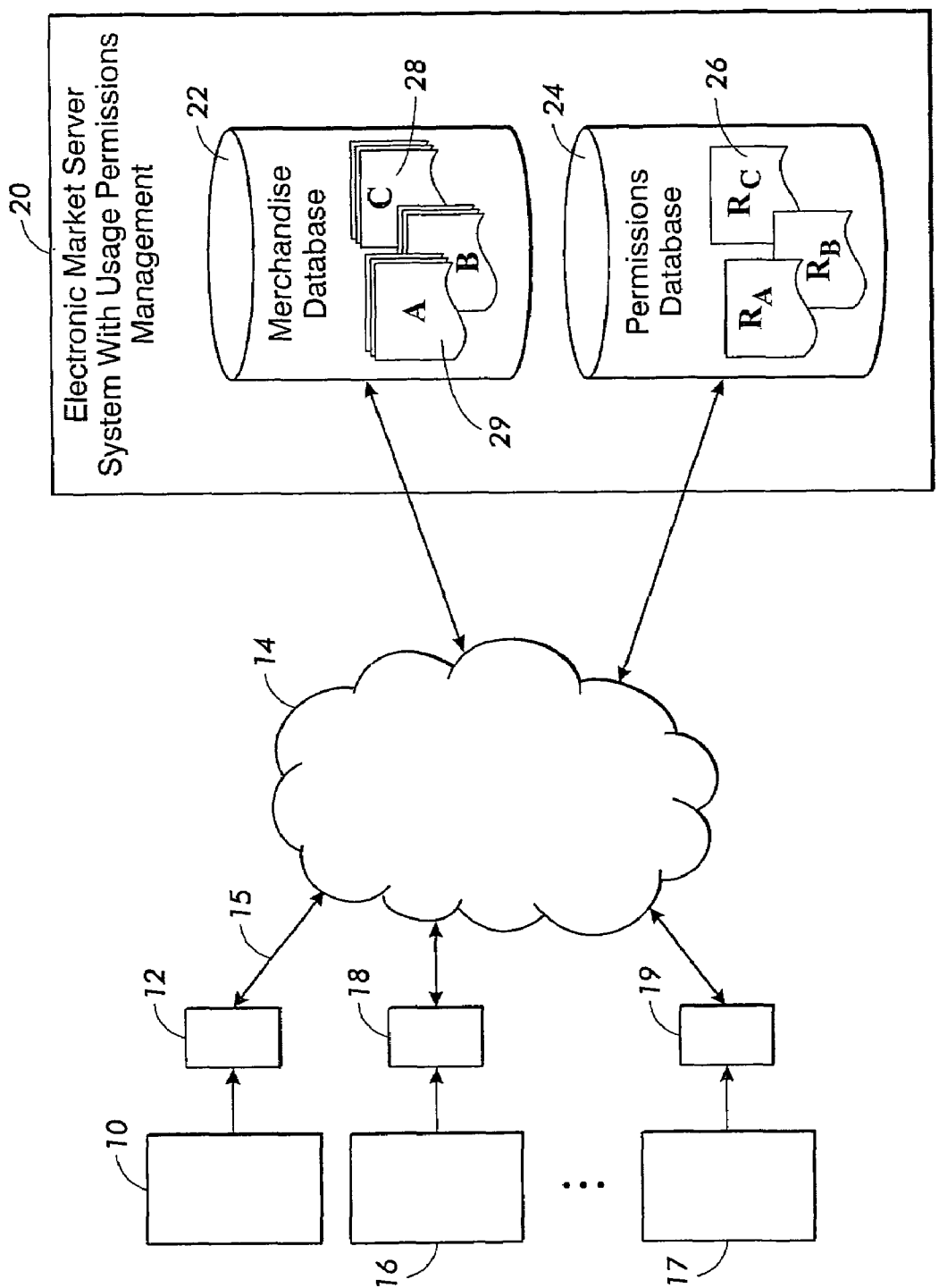
FIG. 1 is a block diagram of a system which may implement the concepts of the present invention.

Turning to FIG. 1, illustrated is a block diagram of a system in accordance with one aspect of the present invention. A first user 10 having a computer or other electronic communication device 12 is connected to an electronic communication system such as the Internet, World Wide Web, private network, or other electronic communication system 14 via a communication access system 15. The communication access system 15 may be any known hardware and/or software used to provide users with a path onto the Internet or other communication network. Such communication access systems are well known in the art and one general type is known as a web browser. Thus, the distributed administration of the application may be accomplished through a web browser through a user account on a permissions server that has administrative permissions. Second user 16 through n user 17, also have a computer or electronic communication devices 18, 19 connected to communication system 14. It is to be understood that users 10, 16, 17 are representative of a community of users electronically interconnected, through communication network 14, to an electronic market server system 20.

Electronic market server system 20 includes an access/usage permissions server/database 24 and a merchandise server/database 22. These databases may be located on the same or different servers of system 20, and in some embodiments may be described themselves as servers. As may be seen by FIG. 1, in this design, electronic content is stored separate from the permissions necessary to use the content. For example, as shown in FIG. 1, permissions 26 of server/database 22 are associated with contents 28 in the merchandise server/database 24.

When a first user 10 wishes, for example, to make ContentA 29 available to others, user 10 may become a marketmaker, since each user is provided with the ability to this content with usage permissions.

Using such a system, any user of the community, for example the first user (marketmaker) 10, may form their own electronic market via the use of their web browser or other appropriate interface. Particularly, the marketmaker will upload the electronic content, and may encrypt the content and embed the electronic content identifier and server location with the content.

The marketmaker is provided with the capability of creating and administrating the market as a public market or a private market with selected access and/or usage options. More specifically, and as shown in FIG. 2, for each market and content in a market, a permissions matrix file 40 is generated. Included in permissions matrix file 40 is an indication of the title of the content 42, the owner of the content 44, and an access list matrix 48 which supplies the various access and usage permissions, and fees for particular users. In the present embodiment, the usage permissions 49 include a view permission 50, a print permission 52, and a usage fee 58; access permissions 54, include a write permission 56, and a manage permission 57. The left-most column 60 of the matrix lists users or groups of users having various usage and access capabilities.

In this example, the user/group listing "Anyone" 61 gives all users of the community view 50, print 52, and write 56 permissions. This indicates the market is public. In this example, only the user account identified as "Tao Liang" is given manage 54 permissions. Manage permissions allow particular users/groups to change all elements of the permissions matrix 40, including the user/group list, the usage permissions 49, access permissions 54, and usage fees 58 for each user/group listing. Manage permissions also allow particular users/groups to change the location of the content by specifying in which markets the content will appear. Permission matrix files 40, are constructed for both the markets themselves and for individual content within the markets. Distinctions between usage permissions and access permissions will be described in greater detail in following sections of the description.

As previously noted, any user of the community of users within the network may create a market, which may be a single electronic piece of content or multiple distinct content.

Figure 3:
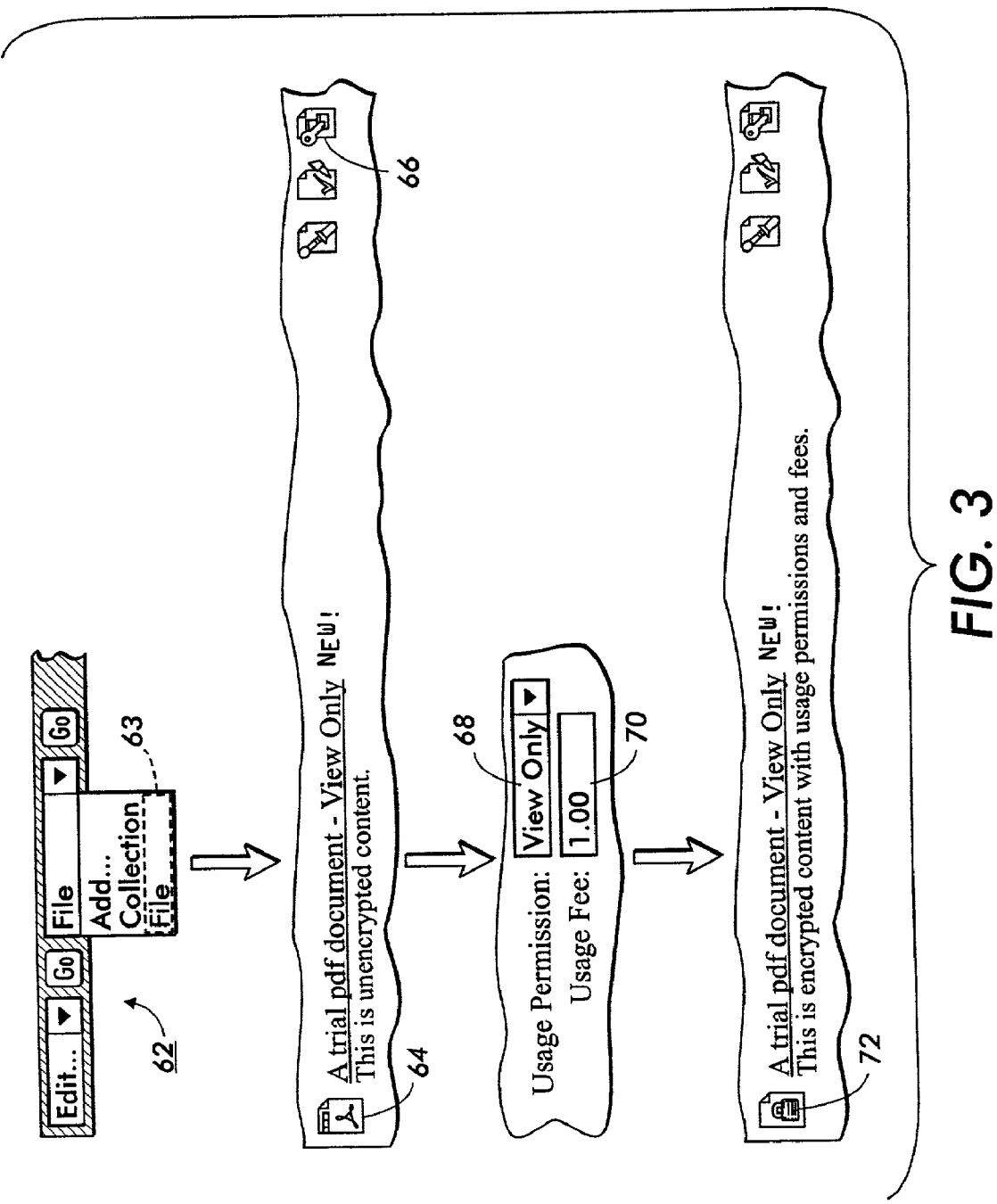
FIG. 3 depicts one implementation whereby a user may upload content for a market being created.

Turning to FIG. 3, depicted are portions of a screen which may be presented to a marketmaker, to simplify uploading an electronic content to a market. The marketmaker is presented with a toolbar 62 having a dropdown menu 63 which permits the marketmaker to add content to a market. This process causes the selected electronic content to be uploaded to the electronic market server system 20 (of FIG. 1), and may be accomplished through known techniques such as taught for example by the DocuShare system from Xerox. The selected file 64 is at this point in an unencrypted format. The marketmaker is presented with a "new services icon" 66, which when selected provides the marketmaker with the ability to set usage permissions such as "view only" 68, among others, and to also input a usage fee 70 for the document. It is to be appreciated that in one embodiment the system is designed to supply predetermined default permissions, which the marketmaker is able to change.

Once the permissions are selected, the system, in one embodiment, encrypts and automatically stores the encrypted content 72 in place of the previously unencrypted content 64. The process shown in FIG. 3 may be considered publishing of the content to the electronic market.

Figure 4:
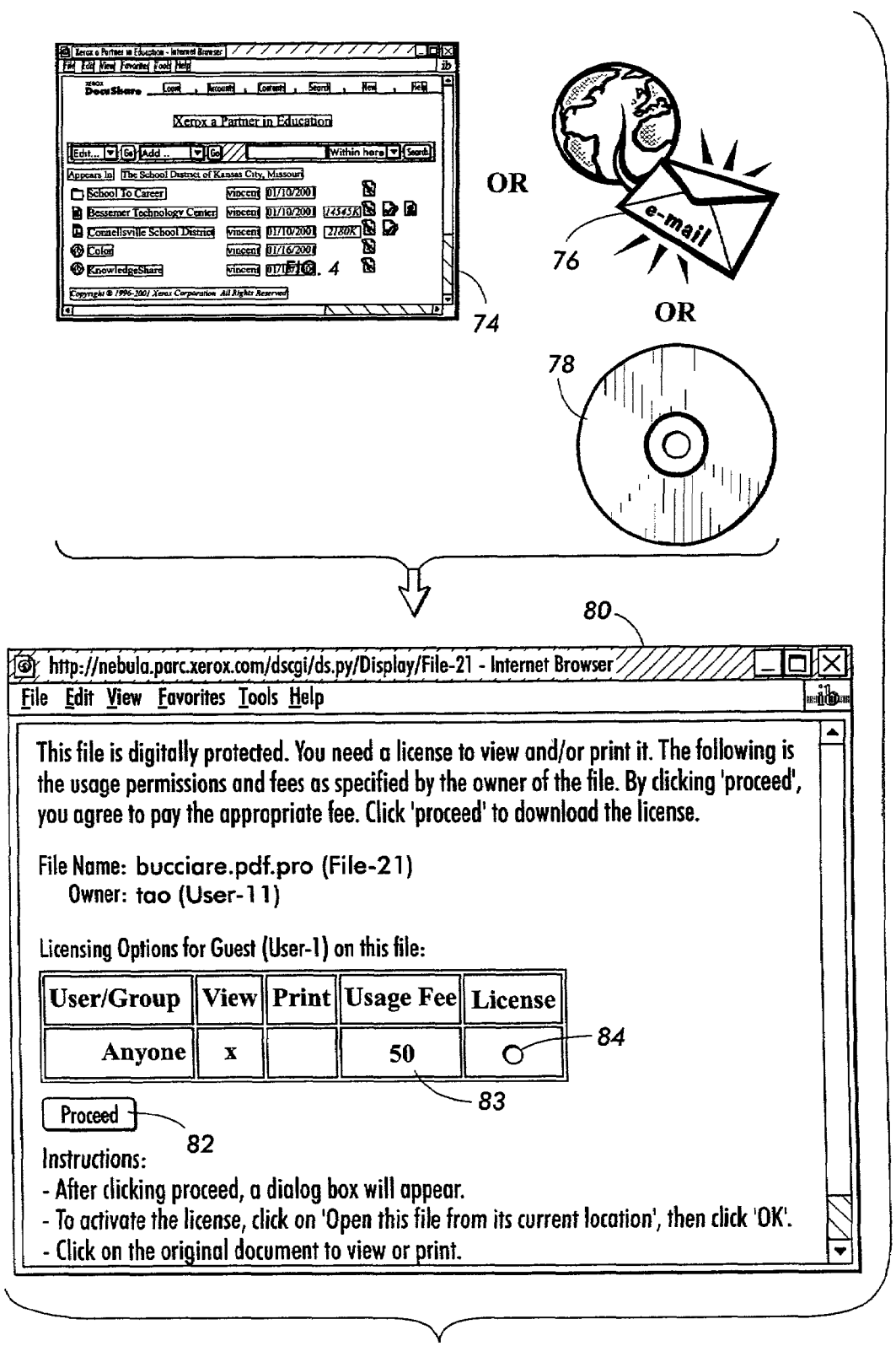
FIG. 4 illustrates the various sources from which electronic content file may be obtained.

FIG. 4 is a diagram which emphasizes that a content in the market may have been obtained by distribution within the system 74, provided to the system via an e-mail message 76, or distributed through a CD ROM, floppy disc or other portable electronic medium 78. When the content is opened, client software reads the URL of the permissions server and the electronic content ID embedded in the content, and connects through the communication network to display appropriate options and obtain permissions to view and/or print the content identified by the electronic content identifier, as shown by screen 80.

Figure 5:
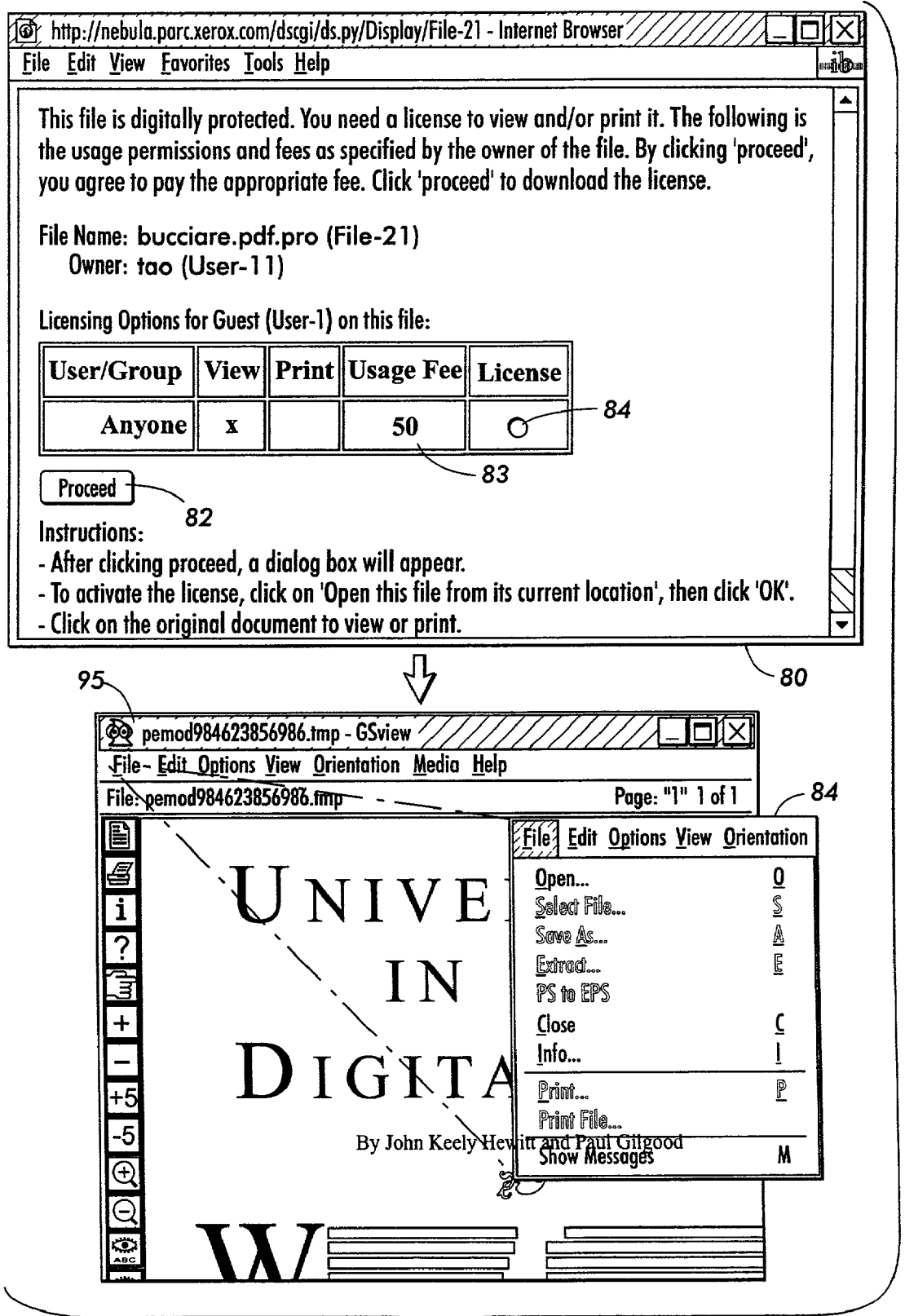
FIG. 5 provides additional detail of elements disabled through the use of the present system.

Turning to FIG. 5, the viewing operations of the system are described. Particularly, screen 80 instructs a user that the content is digitally protected and that a license is needed to view and/or print the content. Also noted is that the usage permissions and fees are specified by the owner (the seller). Once the user selects the "Proceed" button 82, agreement is made to pay the usage fee 83. To obtain a license, the user is directed to click on the "License" button 84. If the conditions are met, such as the user having an appropriate license, a options menu 84 is provided to the user, and dependent on the permissions granted by the marketmaker the various options will either be enabled or disabled. In this embodiment, the marketmaker as determined for all users ("Anyone"), the available options are to open the content 86, to close the content 88, to obtain information 90, or to show messages 92. Other options, e.g., save as 93, print 94, etc., have been disabled. When the user selects the open option 86, the content is displayed for viewing 95 on the user's computer screen. The content is presented via the use of viewer software which also provides the appropriate menu items to be enabled or disabled in accordance with the permissions granted by the seller.

In one scenario, concepts of the present embodiment may be used by firms which create significant amounts of electronic content in the form of service manuals, training videos, sales and marketing collaterals, and a variety of other materials. Many of these firms also sell these materials to distributors and other external agents who sell the firm's content. Companies are interested in not allowing their competitors to have access to these content, and spend significant effort to avoid this from occurring by controlling usage of documents through encryption and passwords with expiration dates.

The present embodiment permits such publishers to use a web browser and Internet connection, to easily create and maintain a private market for this content. Through the use of a browser, users from an organization, such as a community of users, can create the private market, create user accounts and user groups with password protection for access to the market, upload content and encrypt (if desired) for controlling usage of digital content, download digital content for a fee or for free, as well as place an order for physical content (e.g., paper manuals and other collaterals). The system is developed for distributed administration rather than centralized administration.

In another scenario, the present invention may be used by educational institutions who frequently develop unique content such as course curriculum, case studies, and videos of presentations, in addition to content from other sources such as journal articles and books. Such educational institutions often share this unique content for free, or with a fee, among trusted consortium members, which may include other educational institutions and/or firms. The manner of operation of the present system when in the educational environment does not differ greatly from when in the corporate environment. However, the users are different (e.g., teachers, students, industrial peers), and the context is different (e.g., classrooms and consortia). Also the reasons for controlling usage are different. For example, an expressed need at some educational institutions is to control usage beyond the classroom for materials scanned online from external sources that are being used in classes under the copyright fair-use guidelines.

Figure 6:
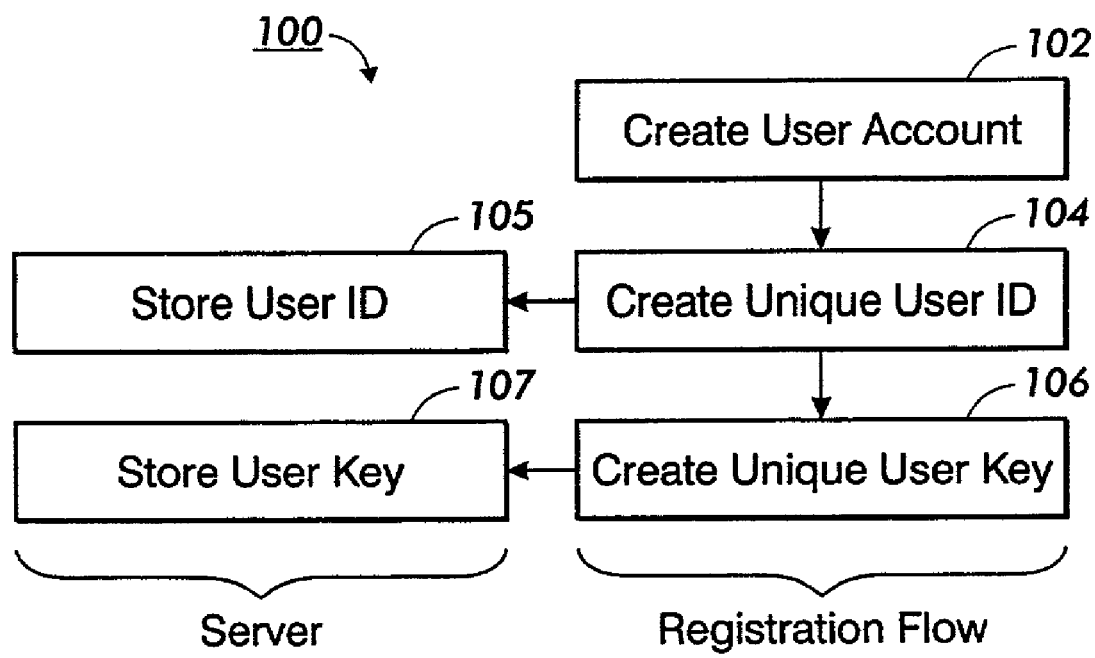
FIG. 6 depicts a registration flow which may be used in accordance with concepts of the present invention.

In order to take advantage of the concepts of the present system, a user needs to be a part of the community of users. This can be either registered in the system or determined by external criteria. An example of such external criteria can be, but not limited to, examining the user's computer IP address. For example, all computers with fully qualified domain name ending in CompanyA.com can be considered part of the CompanyA community. As shown in FIG. 6, illustrated is a process for an individual or group to register and become a member of the community of users. Registration process 100, first creates a user account 102. This operation includes creating a unique user identity (ID) 104, which is then stored 105 in a system server. Next, a unique user key 106 is created, and this key is also stored 107 in a system server. Steps for creating the user account 102, creating the user ID 104 and creating a unique user key 106, as well as storing the user ID 105 and key 107 are well known in the art, and may be accomplished by a variety of processes and will therefore will not be expanded upon in greater detail.

Figure 7:
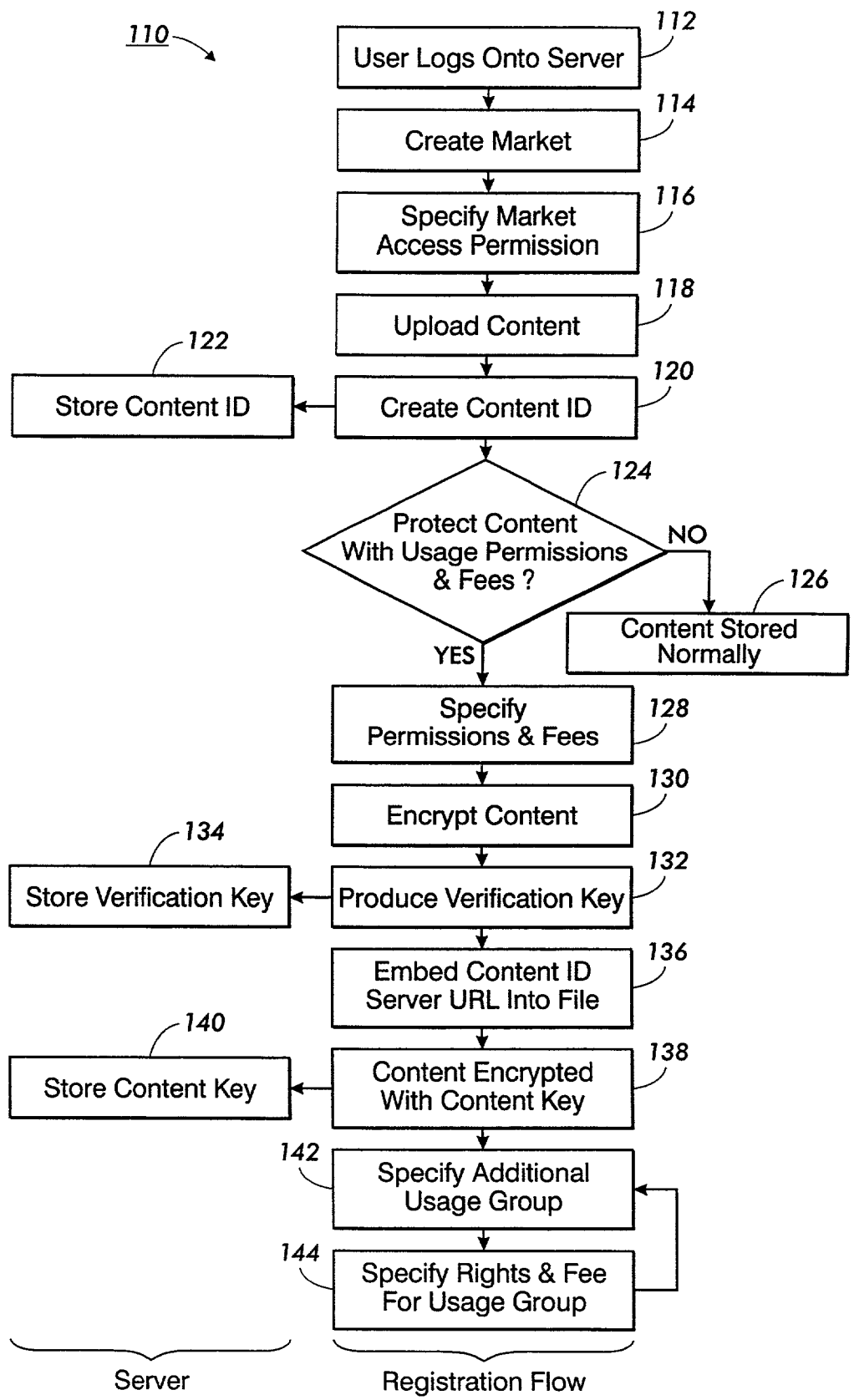
FIG. 7 depicts the process flow for generating or creating a market by a market maker.

Any registered user may then decide that they wish to create a market and become a marketmaker. This capability emphasizes the distributed administrative nature of the system as opposed to the centralize requirements of existing systems. In the present embodiment, and as shown more particularly in FIG. 7, steps for one embodiment of creating or authoring a market 110 are illustrated. Initially, the registered user logs onto a permissions server 112, calling up the process to create a market 114. At step 114 a collection (i.e., the market) is created having in one embodiment a preselected set of access permissions. At this point the market has no content (e.g., electronic document files). The preselected access permissions may be altered in a following step, and in other embodiments, no preselected access permissions may be provided. The market collection is designed so as to allow content to be added thereto, and one example of such a collection concept is found in connection with the DocuShare system of Xerox Corporation.

As previously discussed, although the step of creating the market 114 includes preselected access permissions, the marketmaker is given the ability to alter these permissions 116. The marketmaker has the control to provide access to all users of the community and therefore create a public type market, or to limit access to specific users and/or groups such that the market may be considered a private market.

Following the specifying of access permissions, which is to be placed in the market is uploaded to a system server 118. As part of the upload process, a unique electronic content identifier is created 120 for the content which is stored on the server 122. Any number of distinct contents may be uploaded and are made part of the market, and by default, this content will inherit the permissions of the market (i.e., collection). The marketmaker is also provided with the capability to implement content protection procedures by supplying usage permissions and fees associated with that specific file 124. For example, this is shown in connection with previously described FIG. 2 where the usage permissions are view and print, and the usage fees may be different for different users. If the marketmaker determines that no usage permissions are needed and/or no fees are charged for particular content, the content is simply stored in a normally accessible, non-encrypted manner 126.

When it is determined usage permissions and/or fees are to be included, the marketmaker specifies the permissions and fees 128 as discussed in connection with FIG. 2.

Once specific permissions and fees have been set, the system moves to encrypt the selected electronic content 130. Various encryption techniques may be used in conformance with the present concepts. In one particular embodiment, a verification key is generated 132 in order to ensure that the proper content is being supplied when it is decrypted. The generated verification fee is stored in a server 134. The content then has embedded, the unique electronic content identifier (of steps 120, 122) and the permissions server URL 136. The content is then encrypted using a random content key 138, which is stored in a system server 140. Again, since encryption processes which may be used herein are well known in the art, they will not therefore need to be described in greater detail.

As a next step in the process flow, the marketmaker is provided with an opportunity to specify additional users and/or usage groups 142, change permissions and fees for currently listed users and/or groups, or delete existing users and/or groups from the list. If additional individual users or groups are added, then the specific permissions and fees for the users or groups are specified 144. Steps 142 and 144 may be repeated until all modifications to usage permissions are addressed. Steps 142, 144 may be repeated independently of each other, and may be repeated at any subsequent time by any authorized user who has appropriate manage permissions The steps of FIG. 7 result in the creation of an electronic marketplace created by a user within the community of users. As previously noted, any one of the users in the community who has appropriate permissions has the capability of creating their own market without the need of a centralized authority to administer the market. Thus, the user/marketmaker has the control to modify and tailor their individual market to their specific needs.

Under the current embodiment, the uploading of the electronic content, such as step 118, uploads unprotected, i.e., non-encrypted content. The access permissions provide access to the digital bits of the electronic content. Therefore, users could, through their access permissions obtain these digital bits at their computer. However, if the content is also encrypted, then it is necessary to have the usage permissions in order to decrypt the files for viewing. If the file was unencrypted, the downloading of the bits would permit access to viewing the content. Therefore, this design permits the use of access permissions for some such as those that are unencrypted, or using access and usage permissions for content which are encrypted and need to be decrypted for viewing.

Once the market has been created, embodiments of the present invention then permit a buyer (i.e., another user of the community) having the appropriate permissions and/or licenses to access the digital content. The operation of the license/usage flow 200 according to an embodiment of the present invention is illustrated in FIGS. 8 and 9.

Figure 8:
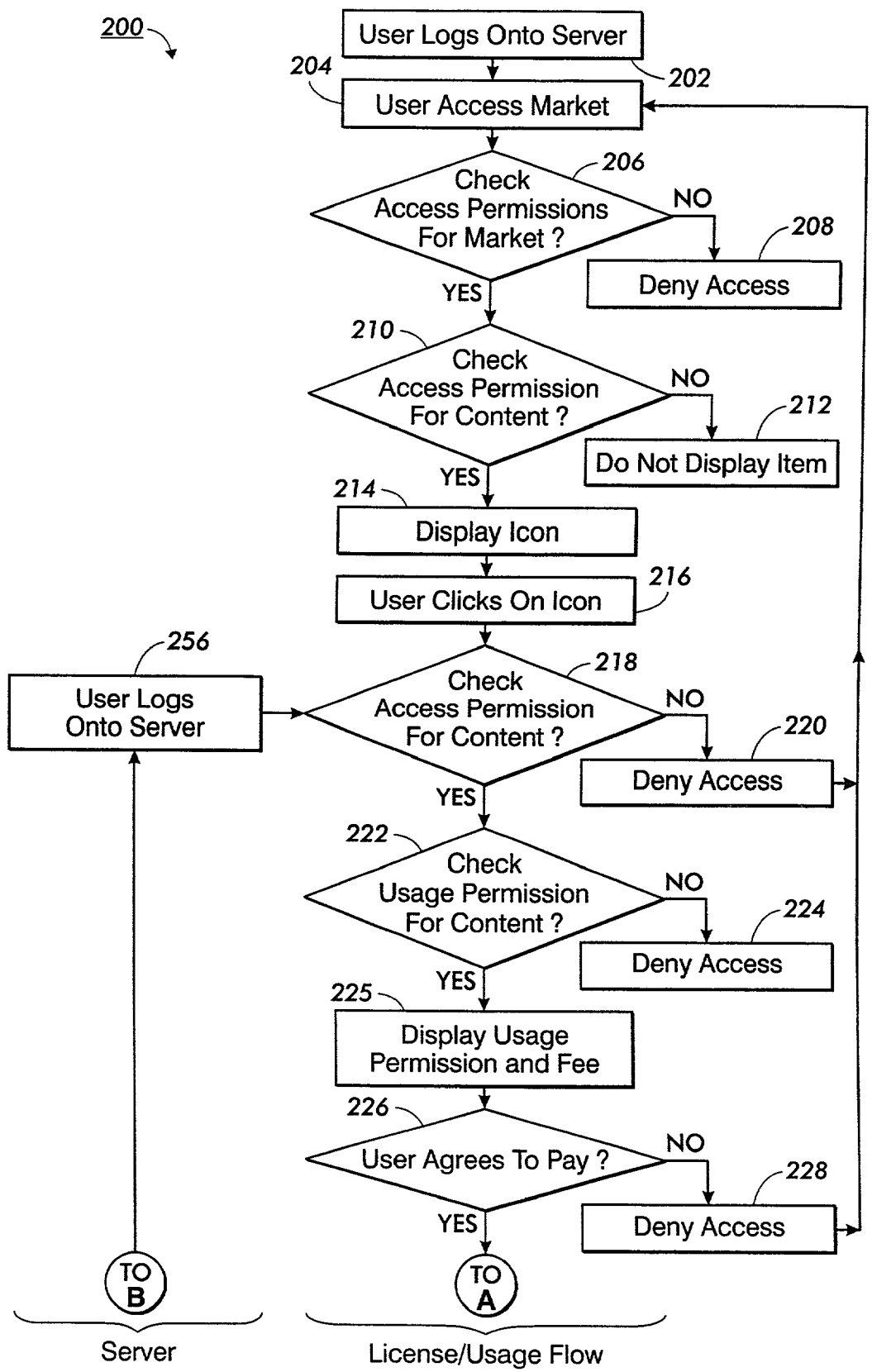
FIGS. 8 and 9 depict the license/usage flow in accordance with the present invention.

As a first step in the process flow of FIG. 8, a user (buyer) logs onto a server of the present system 202. Once logged on, the user requests access to a market 204. The market will have been created and formed by another user (i.e., marketmaker) of the community of users. The flow of authoring or creating the market was discussed in detail in connection with FIG. 7. Upon requesting access in step 204, the process moves to a decision step 206. At the decision step, a system server is interrogated to determine whether that user has access permissions for the particular market requested 206. If it is determined such access permissions do not exist, access will be denied 208. For example, when the user requests access to market A, the server will upload or review a matrix file such as discussed previously in connection with FIG. 3. If the user is included in the user/group section and has permission to have access to the market, then the process moves to step 210 where each electronic content in that market is checked to determine whether that particular user has access permissions to view the existence of that content. If no access permissions are available for a particular content, then that item will not be displayed 212. However, if access permissions for a particular content does exist, the process displays a representation 214 of that content, such as in the form of an icon.

Therefore, the steps 206-214 provide a two-level access permissions flow. A first access permission checks whether matrices previously stored in a server for a particular market will permit that user to enter the market. Once it is determined the user has access to the market, then within each market, a review is made as to the particular content which has been previously uploaded to the market, as described in connection with step 210. If the user is permitted to view content, an icon representing that content is displayed. Therefore, in a situation where the user has been allowed into a particular market (i.e., collection) and there are for example ten distinct pieces of content, it is possible that the user will only be permitted to view the content icons for a subset of the content (i.e., they may only see 5 out of the 10). This flow permits precise control over who may access a particular market as well as content within that market.

Figure 9:
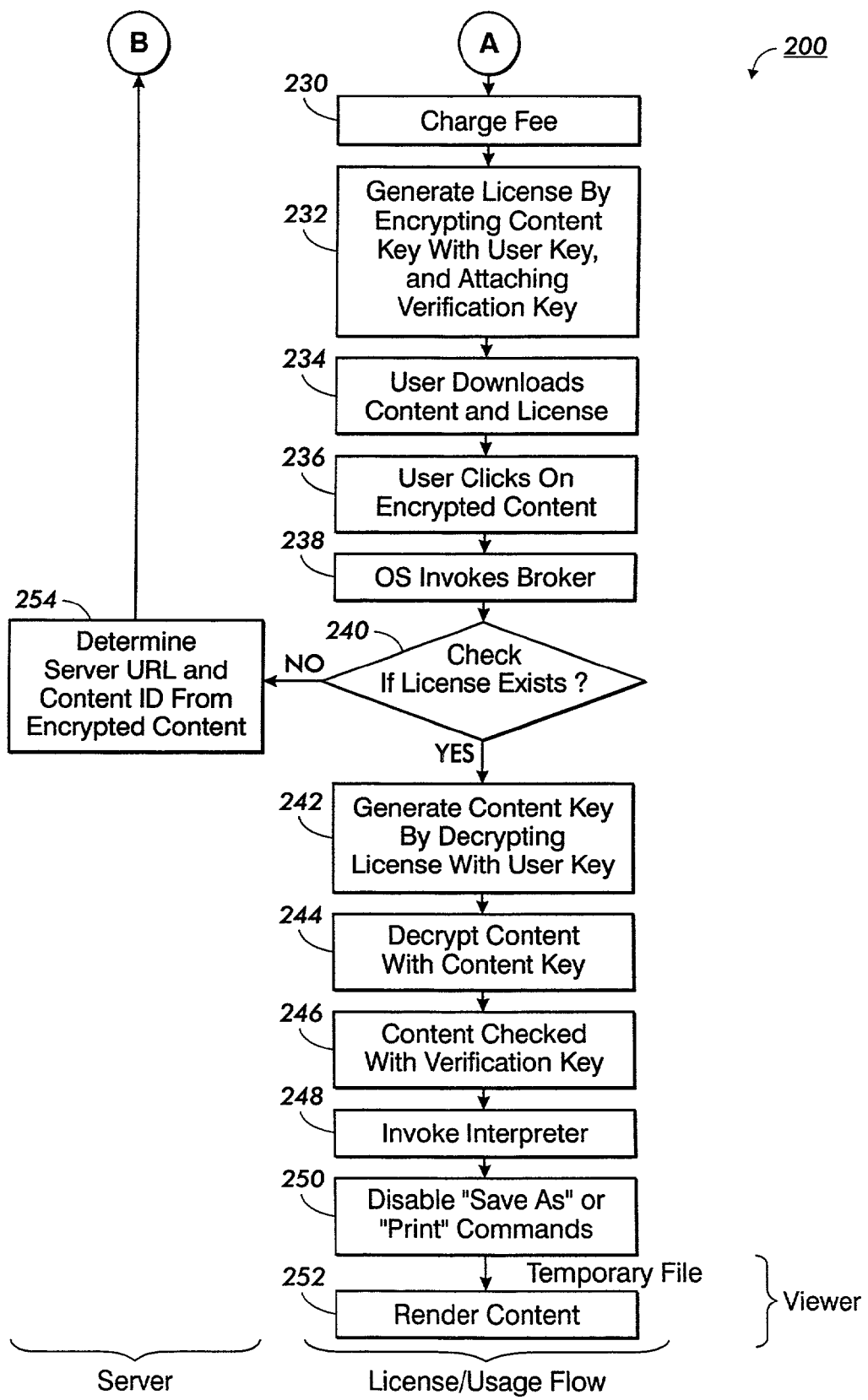

With continued attention to the flow of FIGS. 8 and 9, once an icon 214 is displayed, the user may select the icon by clicking on it with a computer mouse or other input device 216. Selection of the icon in step 216 moves the process to a decision block step 218, where a second check of access permissions for the selected file is again undertaken.

This second check of access permissions 218 is also undertaken to ensure that permissions that were previously checked in step 210 are still valid. Particularly, the checking at step 218 is used as the step 210 may be accomplished when a user enters a market, but significant time may pass between the time when it is verified the user has access permission 210, until specific content is selected in step 216. Therefore, step 218 provides the benefit of a "double check." One example of this delay situation is where a user logs on at the beginning of the day and does not make access to particular content until the end of the day. During this time period access permissions could potentially change. Also, in another embodiment the system may be designed to check different access permission at different steps 210 and 218. In some embodiments this "double check" process may not be implemented. This "second check" is also undertaken to enable the scenario where a user already has encrypted content, and only needs to check access permissions for the particular content rather than for all content in the associated market. This scenario is described in more detail in preceding paragraphs.

If the access permissions are not available, the process moves to step 220 and access is denied. Alternatively, if it is determined access permissions for that particular content does exist, the process moves to a next decision step where usage permissions for that content are checked 222. When the specific usage permissions do not exist, access is denied 224. On the other hand, when usage permissions exist for that particular user, the process moves to step 225 which displays usage permissions and fees. One embodiment of such display would be screen 80 of FIG. 5. It is to be appreciated that this is simply one embodiment in which the permissions and fees may be displayed to a user. Alternative embodiments may not even show the permissions but rather just the usage fee if desired.

Returning to FIGS. 8 and 9, the user is presented with an option to pay the required usage fee 226. Not paying the usage fee ends the process and denies access to the content 228. Upon selection (such as selecting proceed button 82 of FIG. 5), the fee will be charged 230 to an account of the user. Creating accounts where a user may be charged for purchases, etc. is very well known in the art. This also is simply one embodiment, as alternative embodiments may not show fees, especially in cases where the usage is controlled with no fees.

Once this selection is made, the process moves to the generation of a license through a process of encrypting the content key with the user key, and attaching a verification key 232. The user will then download the content and the license 234. It is to be noted that the generated license in step 232 is downloaded to the computer of the user. More particularly, the license is user/machine specific.

Next the user selects the encrypted content through a selection mechanism such as a mouse or other input device. At this point the process moves to step 238 where the operating system invokes the broker or viewer. The broker takes the encrypted content and looks for the license, and verifies that the license is present on the user's computer. Particularly, the process moves to step 240 where the decision block checks if the license exits via the use of the broker. When a license does exist, the content key is generated by decrypting the license with the user key 242 and the content is decrypted through use of the content key 244. Once the content has been decrypted, a verification process is undertaken with the verification key to ensure that it is the proper content.

At this point, a rendering software is invoked 248 such as "GhostScript" (a viewer and/or player which interprets the PostScript language (GhostScript is a trademark of Ghostgum Software Pty. Ltd., and PostScript is a trademark of Adobe Corporation.)) to permit viewing and/or displaying of content. It is to be understood that reference to PostScript and GhostScript are referred to only as examples, and the concepts of the present application may be implemented in conjunction with use of other languages and/or viewers or players. This system will also disable the commands in the pull-down bars such as shown in FIG. 5 which are inappropriate for the usage permissions for that particular user (buyer). Particularly, in this example the "save as" and "print" commands may be disabled and therefore are not accessible to this user 250. The process of the system then renders the content 252 to a screen to be viewed by the user.

If at step 240, the broker is unable to determine that a license exists on the user's computer, the system then moves to step 254 where the system reads the encrypted file to determine the URL server and electronic content identifier of the encrypted content. Using this information, the system logs in to the server 256, and the process of FIGS. 8 and 9 proceeds from step 218 forward, to generate a license on the user's computer.

It is also noted that when the deny access step 220 occurs, the process loops back to step 204 permitting the user again to attempt to enter or access a market on the system.

Lastly, steps 210 and 214 show a capability of checking multiple accesses for the content in the market and displaying the icons in accordance with the existence or nonexistence of appropriate access permissions.

Figure 10:
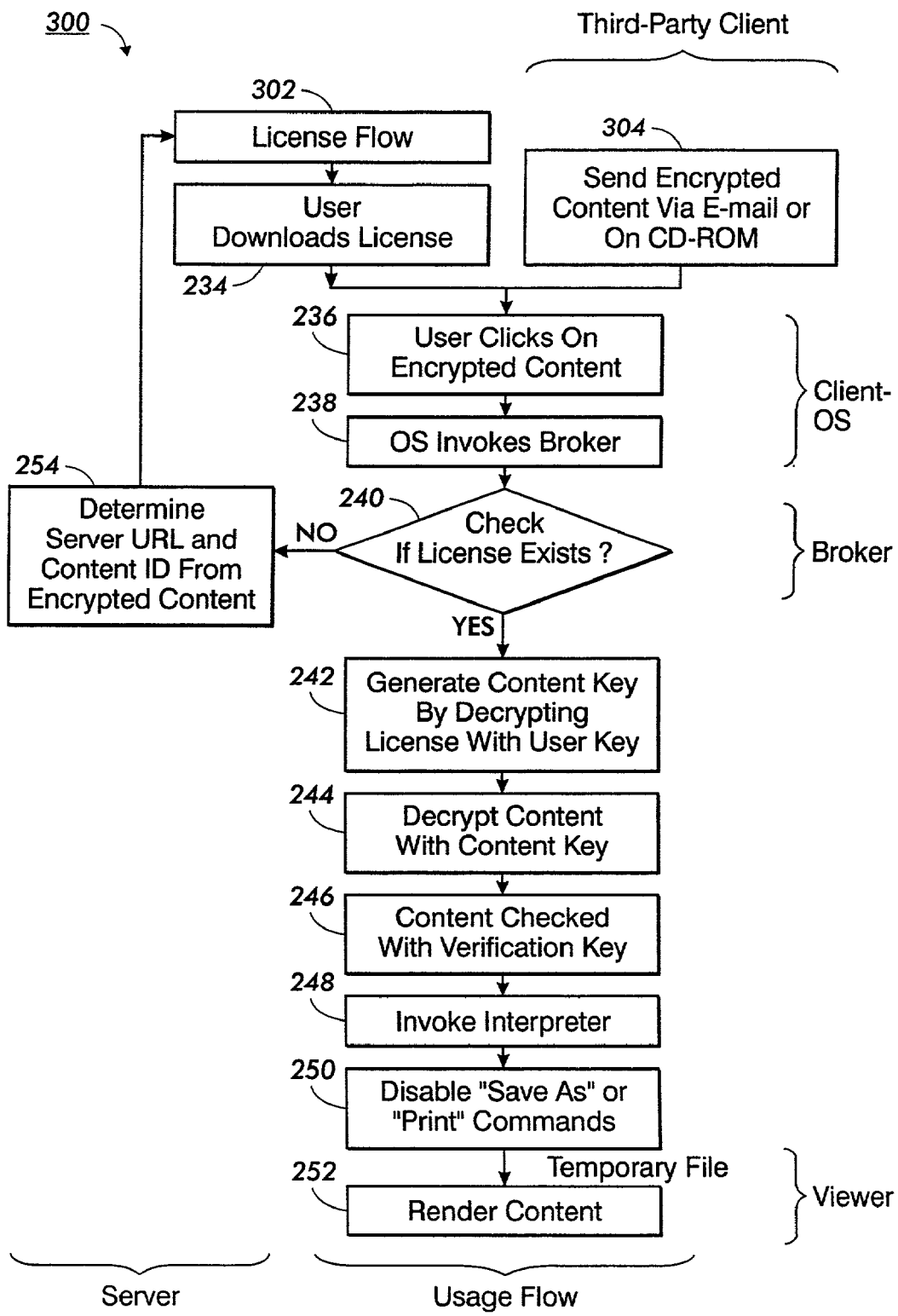
FIG. 10 depicts the usage flow when the electronic content is obtained from within the server network or from a third-party client.

Turning to FIG. 10, illustrated is a flow diagram 300 which illustrates the process by which the system receives an uploading of content from within the system, as well as content via e-mail, on a CD ROM, floppy disc or other portable memory devices. The various steps in flow diagram 300 which are similar to those of the license/usage flow 200 of FIGS. 8 and 9 are similarly numbered.

Returning to FIG. 10 license flow 302 is a generally representative block diagram of the various steps including step 256 and steps 218-232 of FIGS. 8 and 9. Particularly, when the checking of the license step 240 determines that no license exists, the process moves to step 254 where the server URL and electronic content identifier of the encrypted content is determined. The process then moves in a similar manner as described in connection with FIG. 8.

The main thrust of FIG. 10 is the alternative input block 304 where a third-party client may provide an encrypted content 304 into the system. Once received by the system, operation for decrypting and displaying are as previously discussed in connection with FIGS. 8 and 9.

The foregoing describes, therefore, a system where a server identifier (e.g., URL) and a content identifier (e.g., a content number of the content on the identified server) are encoded with the encrypted content, while the permissions for particular content of a particular individual or group account is stored in the server. This process works to associate a set of usage permissions without attaching them to the electronic content.

This system also differentiates itself from existing systems by having access to the decryption keys controlled through at least one authenticated account (e.g., password protected login account) on the identified permissions server. This is opposed to existing systems which associate passwords to files and which simply verify the password locally without contacting a permissions server.

An issue of existing systems for managing usage permissions is that they are only accessible through electronic user interfaces, yet paper has the potential to be a more convenient interface in certain instances. Also, previous systems do not provide the ability to automatically correlate usage permissions with paper documents.

In a further embodiment of the present invention, as illustrated in FIG. 10, shown is a system 400 which permits an interface to an electronic market via the use of paper. More specifically, a user (marketmaker) of the community is able to use a paper interface to create and administer an electronic market, including adding electronic content to an electronic market the marketmaker has previously created. More particularly, when user (marketmaker) 402 wishes to add content of a hard copy paper article or document 404 to an electronic market server system 406, the marketmaker may employ paper interface 408. The paper interface can be used to specify digital rights associated with content in an electronic market. Thus, the concepts of the present invention simplifies a workflow associated with specifying usage permissions and/or fees when the content of interest is originally in a paper format.

Figure 11:
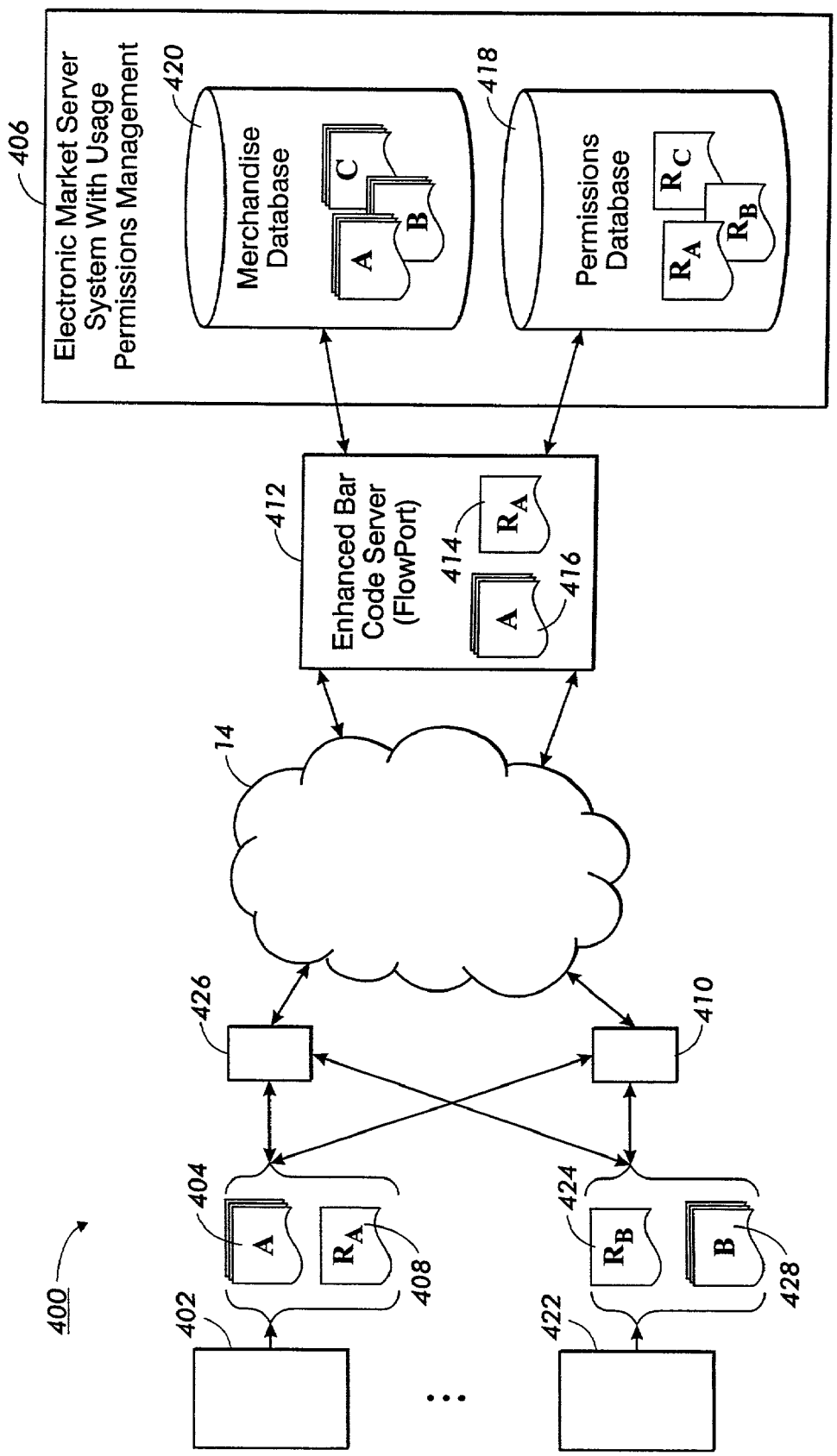
FIG. 11 provides a overview for a system which permits the use of paper as an interface to electronic markets with usage permissions, for both specification of usage permissions and for managing usage of content including payment once usage permissions are established.

Rather than scanning the paper document into an electronic format and later specifying usage permissions and/or fees using an electronic interface, these separate processes are combined into a single process by using a machine readable cover sheet encoded with enhanced bar codes. Thus, in FIG. 11, user (marketmaker) 402 submits the paper documents 404 to a network printer/scanner 410 which scans the electronic paper interface 408 and document 404 into an electronic format. This information is submitted to enhanced barcode server 412, via a communication network 14. One type of enhanced barcode server may be a system known as FlowPort which is a product of Xerox Corporation. When the enhanced barcode server reads the digitized version 414 of paper interface 408, and the digitized version 416 of document 404, the content is appropriately stored in the electronic market by storing the digitized interface subject matter into rights database 418 and the content into merchandise database 420 of the server system hosting electronic market 406.

Such paper interfaces can be used to also initiate a transaction with an electronic market having usage permissions. For example, a buyer 422 uses a paper interface 424 having a unique identification encoded on paper using enhanced barcodes. This may be submitted to the electronic system via the network system 410 or a fax machine 426 which in turn provides the interface material to the enhanced barcode server 412. The enhanced barcode server would read the now-digitized information thereby allowing the user to implement a paper document to initiate a purchase, record usage of property or initiate some other usage permissions transaction. The present system has an advantage over existing systems and will afford a portability not presently in existence. The technology also significantly reduces the barrier for people to obtain and pay for legal copies of copyrighted materials.

Once the user's request via paper interface 424 has been received, appropriate operation of the system, as previously described, will take place and the user's requested content, for example document 404, may be delivered via the fax machine 426 or network printer/scanner 428.

Thus, described is a system and method for using paper as an interface to electronic markets with usage permissions, for both specification of usage permissions and for managing usage of content including payment once usage permissions are established. This is accomplished by using machine readable enhanced barcodes (e.g., Xerox data glyphs) on paper forms, and a system that interprets the forms. This process streamlines the workflow for specifying usage permissions, correlating usage permissions with individuals and/or groups, and specifying payment options. This also enables new functionality for managing usage with usage permissions by consumers. For example, it may be used to initiate payment, specify distribution mechanisms, point of delivery, and record usage all through the use of a paper interface. For digital documents, users can initiate immediate fulfillment.

Turning to FIG. 12 illustrated is one embodiment of a paper interface 430 which is exemplary of such materials which may be used in connection with the present invention In this embodiment, paper interface 430 includes a selection of the marketplace (electronic market) 432. Also provided are a permissions and fees section 434 wherein selection of the particular boxes will set the access permissions and usage permissions for the accompanying paper document which is also being scanned. A cancel box 436 provides for the canceling of previous statements, and a help box 438 returns information on how to further process the paper interface. Barcode 440 identifies the paper interface 430 as one to be included in the system of the electronic markets described previously. It is to be appreciated that a user can create (author) a market by also using the paper interface concepts described.

Once a product (e.g., electronic document file) is stored within an electronic market, a paper interface can be used to modify previously set permissions. For example, in the foregoing discussion, once a paper document is scanned and stored in the market as content, a paper token is returned which uniquely identifies the content stored in the electronic market using enhanced barcodes. When the marketmaker wants to modify the usage permissions (for example increase the price), the marketmaker takes the paper token, selects appropriate boxes on the form to change the usage permissions (e.g., view permission and associated price), and then scans just the token into the system. An example of a token (used for other purposes) is also described in connection with FIG. 12.

Turning to FIG. 13, illustrated is one embodiment of a paper token 450 which may be used to obtain previously stored electronic documents. In this embodiment, the price for a specific document is shown 452, and a icon or representation of the document to be selected is also shown 454. The quantity 456 and method of fulfillment 458 may also be selected. Particularly, the method of fulfillment may be a local copy to a personal computer, an e-mail copy, an internet fax, via postal mail or through Express Mail. The token 450 also includes a machine readable enhanced barcode 460 that uniquely identifies the electronic market, the content in the market, and the token itself for interpretation of the box selections, in addition to having human readable information that identifies the content in the associated market. It is to be appreciated that a paper token according to the concepts of the present description may of course take numerous forms other than the layout described above.

In an alternative, the token may already include a unique identifier for a user (buyer) or user group (group of buyers), and for enhanced security, a personal identification sticker 462 may be placed on the form which can only be used once. One-use stickers are accomplished by having a unique number on each sticker, which is registered as used by an appropriate permissions server. This security can, in another embodiment, be further enhanced to require a password for use with the enhanced barcode form. In addition, tokens with enhanced barcodes may include lists of content in a market, which can be checked to obtain tokens or multiple pieces of content. Also, tokens with enhanced bar codes may include lists of markets, which can be checked to obtain content in those markets.

Thus, in accordance with concept of the present invention, in situations where there are large amounts of documents on paper, such as in a library, a library staff could use a cover sheet for each document scanned, select the appropriate digital rights, and the system would automatically interpret the scanned form and interface with the digital rights server. Therefore, rather than having multiple steps in their workflow, the system reduces this to one step by automatically interfacing with the rights server.

Another benefit is shown in a scenario where a central library obtains numerous requests for hard copies of documents. Even when the original hard-copy document is supplied to the requester, and paid for, commonly the requester then makes multiple copies or provides the opportunity for co-workers to make multiple copies without providing further compensation to the copyright holder. With the present system, an interface cover page (token) may be included with the hard copy of the article provided by the library. When a copy is to be made for a peer, or co-worker, the interface cover page can be faxed and/or scanned and the encoded rights information can be communicated through the internet to a central permissions server or a local permissions server in order to maintain some control within the organization. The interface cover page may have options for only initiating a charge (local copy of article is made by employee) or can include a unique content identifier listed in the permissions server database, and a unique identification for the corporate library for other paying entity. The server responds by checking the requested transaction against the permissions recorded for the paying entity in the permissions server. These permissions can be structured in a variety of ways, including pay-per-document and prepaid for a number of documents. With the pay-per-document, the server will initiate a new charge to the paying entity. With the prepaid, the server will increment the number of documents requested, check this among the number of the prepaid limit, then a response will be returned to the buyer noting that the limit has been reached and including contact information for the paying entity.

The described system therefore includes options to have the security features for accessing markets, utilizing technology such as one-use personalized enhanced-barcode stickers, password protection through scanning stations, or physical devices such as hardware key/dongle.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A system for administering electronic markets which include encrypted electronic content, the system comprising a connection system to permit connection to a communication network having an electronic server system configured to permit communication among a community of users and for hosting of the electronic markets;

a distributed administration system, wherein any user of the community of users can be provided with a capability of configuring and administering individual ones of the electronic markets, including the capability of uploading selected electronic content to the administered electronic market;

a set of access permissions which control access to the electronic markets, wherein the access permissions control which users of the community of users have access to the electronic markets;

a set of usage permissions which control usage of the encrypted electronic content of the electronic markets; and a paper interface for utilization of the electronic markets including administration of the electronic markets, wherein any user of the community of users can be provided with the capability of configuring and administering individual ones of the electronic markets by using of the paper interface.

2. The system according to claim 1 wherein at least one of the electronic markets has at least one individual user and at least one of the remaining electronic markets has at least one group of users.

3. The system according to claim 2 wherein the individual users and the groups of users have different usage permissions.

4. The system according to claim 1 wherein the encrypted electronic content is a plurality of different content and each of the different content is associated with at least one user group with permission to manage properties of the different content, the managing including administering manage permissions, including a capability which allows particular users or groups to change the associated usage permissions, including a user/group list, usage permissions, access permissions, usage fees for each user/group listing, and manage permissions or change the markets within which the different content appears.

5. The system according to claim 1 wherein the encrypted electronic content includes encrypted electronic document files.

6. The system according to claim 5 wherein selections of certain ones of the access permissions and the usage permissions cause an associated market to be a private market.

7. The system according to claim 1 wherein the encrypted electronic content is stored at a location separate from a location where the access permissions and the usage permissions are controlled.

8. The system according to claim 1 wherein the electronic market contains an embedded content identifier that identifies the server of the electronic server system where the access and the usage permissions are served, wherein the content identifier uniquely identifies the encrypted electronic content on the identified server.

9. The system according to claim 1 wherein access to decryption keys used to decrypt the encrypted electronic content is controlled through at least one authenticated account on the identified permissions server.

10. The system according to claim 1 wherein the paper interface enables specification of usage permissions.

11. The system according to claim 10 wherein the paper interface makes use of enhanced barcodes.

12. The system according to claim 1 wherein the paper interface permits addition of content to the electronic markets.

13. The system according to claim 1 wherein the paper interface permits creation of a new electronic market.

14. The system according to claim 1 wherein the paper interface permits altering permissions of the electronic markets.

15. The system according to claim 1 wherein the paper interface permits obtaining content from the electronic markets.

16. A method of creating and administrating an electronic marketplace comprising:
 forming a network of a community of users electronically interconnected via an electronic communication system, the community of users being a subset of users having access to the electronic communication system;
 logging on, by a first user, to the network of the community of users;
 creating, by the first user, an electronic market;
 specifying access permissions to the market for at least one of other users or groups of the community of users;
 distributing administration of the electronic marketplace, wherein each user of the community of users is able to be provided with a capability of administering permissions which control access and usage of the electronic marketplace and electronic content of the electronic marketplace, and the community of users include end users who are able to be both users of the electronic content of the electronic marketplace and providers of the electronic content, wherein administering of the permissions includes administering manage permissions which allow particular users/groups to change all elements of a permissions matrix, including a user/group list, usage permissions, access permissions, usage fees for each user/group listing, and permissions to change a location of selected electronic content by specifying in which markets the selected electronic content will appear;
 uploading the electronic content to the market;
 creating a unique content identifier identifying the uploaded content;
 storing the content identifier on the server;
 specifying the usage permissions to be associated for the uploaded content;
 embedding into the electronic content the content identifier of the electronic content and the location of a server where the access and the usage permissions have been stored;
 encrypting the electronic content;
 logging on, by a second user or a group, to the network of the community of users;
 accessing, by the second user or group the electronic market created by the first user;
 checking to determine access permissions for the second user or group for access to the market;
 determining access permissions for at least one of the second user and group exists;
 checking for at least one of the second user and the group for access permissions for all content existing in the electronic market;
 displaying content representations for all content determined to have access permission for at least one of the second user and group;
 selecting by the second user or group at least one of the content representations; and
 checking to determine whether the second user or group has manage permissions for the selected content, and if the second user or group has manage permissions, allowing the second user or group to selectively manage the selected content, including:
  changing a selected element of the permissions matrix, including the manage permissions; and
  changing the location of selected electronic content by specifying in which markets the selected content will appear.

17. The method of claim 16 further comprising:
 checking to determine whether the second user or group has additional access permissions for the selected content;
 checking whether the second user or group has usage permissions for the selected content;
 determining the second user or group has access permissions for the selected content;
 checking whether the second user or group has usage permissions for the selected content;
 determining the second user or group has the usage permissions for the selected content;
 displaying the usage permissions and fees associated with the selected content to the second user or group; and
 providing a paper interface, wherein each user of the community of users is able to be provided with the capability of administering permissions by means of the paper interface.

18. The method of claim 17 further comprising:
 generating a license by encrypting a content key with a user key and attaching a verification key;
 downloading by the second user or group the content and the license;
 selecting the encrypted file, by the second user or group, and invoking operation of a client operating system;
 checking to determine whether a license does exist;
 generating, when it is determined a license exists, the content key by decrypting a license with the user key;
 decrypting content of the content key;
 checking the content with the verification key;
 invoking interpretation operations;
 disabling save-as and/or print commands which would permit the second user or group to alter the content; and
 rendering the content to the second user or group in a readable format.

19. The method according to claim 16 wherein the content is provided via at least one of an encrypted e-mail message, from a server of the system of community of users, or on a CD ROM.

20. The method of claim 16 wherein the step of checking if a license exists determines no license exists further including,
 determining the server location and content identifier to exist with the encrypted content;
 downloading the license for the specified encrypted content;
 again clicking on the encrypted content;
 determining a license exists;
 generating content key by decrypting the license with the user key;
 decrypt the content with the content key;
 check the content with the verification key;

invoke the content viewer;

disable determined commands of the viewer; and rendering the content to at least one of the second user or group.

21. A system for controlling usage of content comprising:

encrypted electronic content that has embedded at least one usage permissions server identifier and at least one encrypted content identifier;

a reader on a computer that reads the at least one usage permissions server identifier and the at least one encrypted content identifier;

a communication system that communicates the at least one encrypted content identifier;

a usage permissions server that receives the at least one encrypted content identifier from the communication system, and that permits usage of the at least one encrypted content identified by the at least one encrypted content identifier, based on usage permissions associated with the identified content and at least one identified authenticated account associated with the identified permissions server by communicating an electronic key to the computer that communicated to the usage permissions server;

a distributed administration system, wherein any user of the community of users is able to be provided with a capability of configuring and administering permissions which control access and usage of an electronic marketplace and the electronic content of the electronic marketplace, including the capability of uploading selected electronic content to the electronic market; and a viewer or player that displays or plays the identified encrypted content after using the communicated electronic key to decrypt the identified encrypted content.

22. The system according to claim 21 wherein the permissions server identifier is a URL and administration of usage permissions can be done using a web browser that has access to the permissions server through the web.

23. The system according to claim 22 wherein permissions are managed using a permissions matrix.

* * * * *